106. COMPOSITIONS, COATING OR PLASTIC.

Patented Oct. 26, 1926.

1,604,317

UNITED STATES PATENT OFFICE.

HENRY L. PRESTHOLDT, OF MINNEAPOLIS, MINNESOTA.

CASEIN GLUE.

No Drawing.  Application filed April 17, 1922. Serial No. 554,206.

My present invention provides a new composition of matter, herein designated as "casein glue", but which, from its broader aspect, is an adhesive composition adapted to be used, by itself or commingled with other substances, as an adhesive coating.

The most important elements of this improved composition are casein, lime, a fluorine salt, (preferably sodium fluoride), sodium silicate, copper chloride and a salt of formic acid, (preferably sodium formate). Preferably, however, trisodium phosphate and oil are added into the composition.

I have obtained a very highly efficient glue or adhesive by the use of the above noted substances in accordance with the following formula:

|  | Parts. |
|---|---|
| Casein | 50 to 75 |
| Calcium hydroxide | 10 to 30 |
| Tri-sodium phosphate | 5 to 20 |
| Sodium fluoride | 2 to 12 |
| Sodium silicate | 3 to 18 |
| Copper chloride | 1 to 5 |
| Sodium formate | ½ to 3 |
| Kerosene | 3 to 5 |
| Castor oil | 1 to 3 |

When a small percentage of calcium hydroxide is used, which is necessary in order to reduce the hardness of the glue joint on knives and tools, and the infusible silicates are substituted, the glue ordinarily loses its water-proof qualities, but I have discovered that when a salt of copper, or preferably copper chloride, is used, the glue becomes substantially perfectly water-proof. The addition of a salt of formic acid, such as sodium formate, increases the liquid life of the glue and stabilizes the glue solution so that, in practice, it may be definitely regulated as to how long the glue will remain in liquid form and suitable for use without any deterioration.

The above noted substances, except the oils, are commingled in dry powdered form and the oils commingled therewith are in such small quantity that they do not make the powdered mass pasty but keep the same from getting into dust form. This adhesive is sold in dry or powdered form, and when it is to be used, it will be introduced into water to form an emulsion, and it is then, of course, that the chemical reactions that develop the adhesive qualities of the composition, will take place. After these reactions have taken place, the emulsion is adapted to be used as a glue or as a coating or to be commingled with other substances, such as paint or calcimine, which contain certain color pigments. When desired, however, the color pigments may be commingled with the dry composition. When the composition is to be used as a glue, no additions to the formula given, except water, will be required.

Casein, when properly treated with solvents, will produce colloidal properties having great adhesive strength. In this formula, I use tri-sodium phosphate and sodium fluoride, (solvents). These alone will not effect a complete solution and bring out all the colloids present in casein, and to effect a more complete solution, I introduce calcium hydroxide. This chemical also has the property of uniting with casein, forming insoluble calcium caseinate, which imparts to the glue emulsion water-proof qualities. In order to reduce the cost of this product, sodium silicate is used. Sodium silicate in solution in this combination has adhesive qualities, but has the peculiar property of reducing the waterproof qualities of the glue mixture. To overcome this, specifically, I introduce copper chloride or some salt of copper, which imparts, when sodium silicate is used, a remarkable resistance to hot and cold water. Sodium formate is used for the purpose of preventing the decomposition of the casein, which takes place very quickly, and liberates ammonia, but by the addition of sodium formate, this rapid change is prevented. The kerosene oil is commingled with the powder for the purpose of preventing the decomposition of calcium hydroxide, which when exposed to the air forms calcium carbonate. Castor oil and kerosene, while desirable, may be omitted from the composition.

What I claim is:
1. An adhesive composition made substan- tially in accordance with the following formula:

| | Parts. |
|---|---|
| Casein | 50 to 75 |
| Calcium hydroxide | 10 to 30 |
| Tri-sodium phosphate | 5 to 20 |
| Sodium fluoride | 2 to 12 |
| Sodium silicate | 3 to 18 |
| Copper chloride | 1 to 5 |

2. An adhesive composition made substantially in accordance with the following formula:

| | Parts. |
|---|---|
| Casein | 50 to 75 |
| Calcium hydroxide | 10 to 30 |
| Tri-sodium phosphate | 5 to 20 |
| Sodium fluoride | 2 to 12 |
| Sodium silicate | 3 to 18 |
| Copper chloride | 1 to 5 |
| Sodium formate | ½ to 3 |

3. An adhesive composition made in accordance with the following formula:

| | Parts. |
|---|---|
| Casein | 50 to 75 |
| Calcium hydroxide | 10 to 30 |
| Tri-sodium phosphate | 5 to 20 |
| Sodium fluoride | 2 to 12 |
| Sodium silicate | 3 to 18 |
| Copper chloride | 1 to 5 |
| Sodium formate | ½ to 3 |
| Kerosene | 3 to 5 |
| Castor oil | 1 to 3 |

In testimony whereof I affix my signature.

HENRY L. PRESTHOLDT.